United States Patent Office 3,183,150
Patented May 11, 1965

3,183,150
NOVEL 15-DEHYDRO-HALO-METHYL-PROGESTERONES
Fritz von Werder, Klaus Brückner, Karl-Heinz Bork, and Harald Metz, Darmstadt, Germany, assignors to E. Merck Aktiengesellschaft, Darmstadt, Germany
No Drawing. Filed Sept. 10, 1962, Ser. No. 222,666
Claims priority, application Germany, Sept. 16, 1961, M 50,326; Sept. 28, 1961, M 50,415, M 50,416, M 50,417
6 Claims. (Cl. 167—53)

The present invention relates to new and useful steroids of the pregnane series.

It is an object of this invention to provide novel compounds having a valuable physiological activity as well as compositions containing these compounds together with pharmaceutically acceptable excipients.

It is a further object of this invention to provide a new process for producing said compounds.

The new compounds of this invention includes those represented by the Formula I

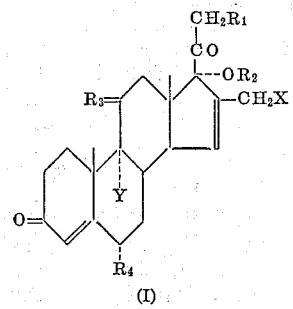

(I)

wherein
$R_1$ designates hydrogen or a free or esterified hydroxyl group;
$R_2$ means hydrogen or an acyl group containing up to 8 carbon atoms;
$R_3$ is selected from the group consisting of H, H; α-H, β-OH; and =O;
$R_4$ designates aydrogen, methyl, chlorine or fluorine;
X designates chlorine or fluorine; and
Y designates hydrogen or fluorine; and the $\Delta^1$-, $\Delta^6$- and $\Delta^{1,6}$-derivatives thereof.

Suitable starting materials for the preparation of the useful therapeutic agents of this invention may be represented by the Formula II

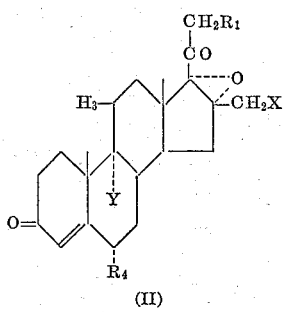

(II)

wherein $R_1$, $R_3$, $R_4$, X and Y have the above meaning. Likewise, the $\Delta^1$-, $\Delta^6$- or $\Delta^{1,6}$-derivatives thereof may be used.

The starting compounds of Formula II are readily available from the corresponding 16-methylene-17α-hydroxy steroids some of which are described in Tetrahedron Letters, No. 16, 1960, pp. 21–32, or which may be obtained from the compounds described in South African Patent 264/61 by saponification of the 17α-acetoxy group and, if desired, by substituting a hydrogen atom in the 21-position by a hydroxyl or acyloxy group according to standard methods. By treatment with N-chloro- or N-bromo-succinimide, such 16-methylene-17α-hydroxy compounds are converted into the 16-bromo- or 16 - chloromethyl-16α,17α-oxido-steroids according to Formula II. Starting with the 16-bromomethyl compounds, the 16-fluoromethyl-16α,17α-oxido steroids of Formula II are prepared by treatment with silver fluoride in acetonitrile or with potassium fluoride in diethyleneglycol.

According to the new process of this invention, a compound of Formula II is treated with a strong inorganic acid in the presence of water and an inert organic solvent miscible with water to form the corresponding 15-dehydro-16-halomethyl-17α-hydroxy steroid of Formula III

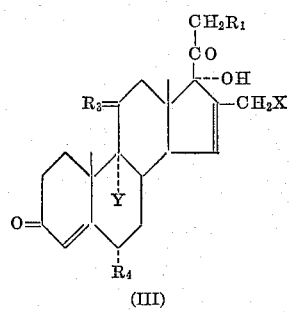

(III)

or the $\Delta^1$-, $\Delta^6$- or $\Delta^{1,6}$-derivative thereof wherein $R_1$, $R_3$, $R_4$, X and Y have the above significance.

Inorganic acids suitable for the process of the present invention are, for example, perchloric acid, hydrogen halides, i.e. hydrochloric, hydrobromic, hydroiodic and hydrofluoric acid, sulfuric acid etc.

The presence of water during the splitting of the oxido ring seems to be necessary for the course of the reaction. It is preferred that the mol ratio of water to organic solvent is approximately from about 3:1 to 1:50.

Suitable inert organic solvents for this reaction are, for example, tetrahydrofuran, acetone, methanol, ethanol, acetonitrile, dimethylformamide, dioxane, or glacial acetic acid. The preferred range of the reaction temperature is from 0° C. to the boiling point of the used solvent. The reaction times vary from ½ to 24 hours depending on starting material and temperature. Generally, the reaction mixture is allowed to stand for about ½ to 2 hours at room temperature. Then it is poured into water whereby the desired product is precipitated. It may be purified by recrystallization or by chromatographic methods.

To prepare the new compounds of this invention, the splitting of the 16-halomethyl-16α,17α-oxido steroids in the presence of the acids and solvents as indicated above is the main reaction and may be carried out at any desired reaction stage. Thus, it may be the final step in the preparation of the useful compounds of Formula I, or, likewise, an intermediate step which is followed by one or more further reactions well known in steroid chemistry.

For example, a hydroxyl group may be introduced into the 11-position of a 15-dehydro-16-halomethyl-17α-hydroxy steroid of the Formula III wherein $R_3$ and Y are hydrogen by usual microbiological methods. All microorganisms suitable for such reactions may be employed, for example, fungi of the genus Curvularia, Mucor, Stachylidium and Streptomyces (introducing a hydroxyl group at the 11β-position) or fungi of the genus Absidia, Cunninghamella, Fusarium, Mucor, Pencillium, Rhizopus (introducing a hydroxyl group at the 11α-position). The hydroxylation is effected according to standard procedures. The starting material is added to a culture of the microorganism which grows in a suitable nutrient solution at optimuum temperature and with aeration. After 10 to 48 hours, the 11-hydroxy steroid is isolated from the reaction mixture, preferably by extraction with a suitable organic solvent such as chloroform or methylene chloride.

The obtained 11-hydroxylated compounds may subsequently be oxidized to from the corresponding 11-keto steroids. For this oxidation, mild oxidizing agents are preferred. For example, chromic acid anhydride in glacial acetic acid or a mixture of chromic acid anhydride and pyridine or a mixture of sodium bichromate, sulfuric acid and acetone may be used. The 11-keto steroids are isolated from the reaction mixture by extraction or by precipitation with water.

Furthermore, a double bond may be introduced at any reaction stage into the 1,2-position. The 1,2-dehydrogenation can be effected chemically or microbiologically. As chemical dehydrogenation agents, there are particularly suitable 2,3-dichloro-5,6-dicyano-benzoquinone or selenium dioxide.

When using selenium dioxide, an alcohol such as t-butanol, t-amyl alcohol, or ethyl acetate is employed as solvent. The reaction can be accelerated by the addition of small amounts of glacial acetic acid. Advantageously, the reaction mixture is refluxed for about 12 to 48 hours. The precipitated selenium is separated.

For a dehydrogenation with 2,3-dichloro-5,6-dicyano benzoquinone, benzene and dioxane, are particularly suitable as solvents.

For the microbiological 1,2-dehydrogenation, there can be used all the microorganisms customary for this purpose. Bacillus sphaericus var. fusiformis, Corynebacterium simplex and Fusarium solani are particularly suitable.

For the dehydrogenation, the starting material is added to a submerged culture of the microorganism employed which grows in a suitable nutrient solution at optimum temperature and with strong aeration in accordance with the customary methods of the fermentation art. Instead of growing cultures, suspensions of the microorganisms in buffer solutions can also be used, the method being otherwise the same. The course of the reaction is observed chromatographically and the fermentatioin solution extracted, for instance with chloroform, after complete reaction of the starting material.

In some cases, 21-O-acyl compounds are converted into 21-OH compounds in the course of a microbiological process as described above.

To introduce a double bond into the 6,1-position, a compound of Formula I or III which is saturated in the 6-position is reacted with chloranil. One advisedly operates in a solvent having a boiling point of about 30 to 150° C. As solvents, the following are, for instance, suitable: alcohols, such as ethanol, tert.-butanol or tert.-amyl alcohol, methyl acetate, ethyl acetate, dioxane, glacial acetic acid, benzene, tetrahydrofuran, acetone, etc.

The compounds of the Formula III wherein $R_1$ is hydrogen can be converted at any desired reaction step into the corresponding 21-hydroxyl or 21-acyloxy compounds. According to the most common method known in the art, the starting material is treated subsequently with an alkaline solution of iodine and with an alkali metal acylate, preferably potassium acetate. The 21-acyloxy compound thus obtained may be saponified, if desired, to form the corresponding 21-alcohol. The saponification is effected in the usual manner, for example, by an aqueous solution of sodium bicarbonate.

To prepare the 9α-fluoro-compounds of the invention, the usual sequence of reactions may be employed. For example, a compound of the Formula III wherein $R_3$ and Y are hydrogen can be hydroxylated microbiologically at the 11-position. Upon treatment with a dehydrating agent, the corresponding 9,11-dehydro compound is obtained which is converted into the 9β,11β-oxido compound with standard procedures. Reaction with hydrogen fluoride results in the formation of the corresponding 9α-fluoro-11β-hydroxy compound.

The 21-position hydroxyl group present in any of the molecules whether starting material, intermediate or product may be readily esterified by standard methods. All acids or their derivatives are suitable which form physiologically acceptable esters. Among the large number of acids to be used, the following are named by way of illustration: acetic acid, propionic acid, butyric acid, trimethyl acetic acid, t.-butyl acetic acid, cyclopentylpropionic acid, phenylpropionic and phenylacetic acid, capronic acid, caprylic acid, palmitic acid, undecylenic acid, benzoic acid, chloroacetic acid, diethylaminoacetic acid, aspartic acid, oxalic acid, succinic acid, phosphoric acid, sulfuric acid. In the event that the esterified 21-hydroxyl group is one derived from a dibasic acid, it is often advantageous to treat such esters with an alkali metal or alkaline earth metal hydroxide to prepare the corresponding salt. Such salts are especially useful because of their increased solubility in water.

To obtain compounds of the Formula I wherein $R_2$ is an acyl group, the corresponding 17α-hydroxyl derivatives are acylated in accordance with known methods customary for tertiary hydroxyl groups. Preferably, a mixture of acetic anhydride and glacial acetic acid, including an addition of p-toluenesulfonic acid, is employed as acylating agent. For 17α-acyloxy derivatives of carboxylic acids of higher carbon content, such as propionic or capronic acid, the corresponding acids and acid anhydrides are used.

The products and methods in accordance with the present invention make it possible to provide the physiologically active valuable 15-dehydro-16-halomethyl compounds of Formula I. The new compounds can be used in veterinary and human medicine as therapeutic agents. The derivatives of the corticoid series possess an increased antiphlogistic activity which is tested according to the method described by R. Hotovy et al. in Archives Internationales de Pharmacodynamie et de Thérapie, vol. 111, p. 420 (1957). The new compounds of this invention belonging to the progesterone series exhibit an increased gestagenic activity. Some of them, particularly those substituted by an 17α-acyloxy-group, are characterized by extremely good oral effectiveness. In the Clauberg test on rats (cf. Journal of Physiology, vol. 83, p. 145 (1934) the new compounds were compared to known gestagenes.

The active compounds of this invention may be administered alone or in combination with acceptable pharmaceutical carriers, the choice of which is determined by the desired route of administration. They can be worked up into all forms of application which are customary for pharmaceutical purposes, such as pills, tablets, dragees, suppositories, emulsions, suspensions or injection solutions. Usual adjuvants, fillers, solvents or solubilizers may be added if desired. In general, the pharmaceutical preparations contain from 0.1 to 70 mg. of the active ingredient. Thus, tablets usually contain about 0.4 to 6 mg. in dosage unit form whereas ampoules contain a somewhat higher dose, such as from 4 to 60 mg.

The dosage of the compounds of the corticoid series is of approximately the same order as the dosage of prednisolone, and the compounds are useful to treat all types of pathological conditions often treated with prednisolone. Because of their great activity, the doses are sometimes even lower than those of prednisolone. As to the compounds of the progesterone type, these ones may be used for all indications of 17α-acetoxy progesterone or 17α-hydroxy-6α-methyl-progesterone. For instance, the substances are suitable as means for combating threatening abortion, for restoring the uterus mucous membranes or in functional uterine bleeding.

The following examples are given solely for illustration and are not to be construed as limitations of this invention. As will be recognized by those skilled in the art, there are many modifications of the processes for the preparation of the new compounds which are intended to be within the full spirit and scope of this invention. Especially, the sequence of the reaction steps may be varied largely, depending on the used starting materials and the desired product.

Example 1

10 g. of 16β-chloromethyl-16α,17α-oxido-1,4-pregnadiene-3,20-dione-11β,21-diol are allowed to stand for 30 minutes at room temperature with 150 ml. of acetone and 50 ml. of concentrated hydrochloric acid (37%). The reaction mixture is poured into 2 l. of water. The separated precipitate is dried and chromatographed through magnesium silicate. The eluates are controlled by thin layer chromatography. The uniform fractions are combined and the solvents are evaporated under reduced pressure. The obtained product is 16-chloromethyl-1,4,15-pregnatriene-3,20-dione-11β,17α,21-triol. $\lambda_{max}$ 244 m$\mu$.

Example 2

5 g. of 16β-fluoromethyl-16α,17α-oxido-4-pregnene-3,20-dione-11β,21-diol are allowed to stand for 2 hours at room temperature with 75 ml. of dioxane and 25 ml. of concentrated hydrochloric acid (37%). The reaction mixture is poured into water. The precipitate is separated and chromatographed through 250 ml. of magnesium silicate. The fractions proved to be uniform by thin layer chromatography are combined and evaporated under reduced pressure. The residue is the 16-fluoromethyl-4,15-pregnadiene-3,20-dione - 11β,17α,21 - triol. M.P. 209–211° C.; $[\alpha]_D$ +69.7° (dioxane);

$$\lambda_{max}. \ 240 \ m\mu, E^{1\%}_{1cm}. \ 440$$

Example 3

According to the method described in Example 2, the 16β-fluoromethyl-16α,17α-oxido-1,4 - pregnadiene - 3,20-dione-11β,21-diol-21-acetate is split to form 16-fluoromethyl-1,4,15-pregnatriene - 3,20-dione-11β,17α,21-triol-21-acetate. M.P. 208–209° C.; $[\alpha]_D$ +47.3° (dioxane);

$$\lambda_{max}. \ 242 \ m\mu, E^{1\%}_{1cm}. \ 382$$

Example 4

(a) In accordance with the method described in Example 1, the 16β-fluoromethyl-16α,17α-oxido-4-pregnene-3,20-dione is split off to form 16-fluoromethyl-4,15-pregnadiene-17α-ol-3,20-dione. M.P. 219–220° C.; $[\alpha]_D$ —8° (chloroform); $\lambda_{max}$ 240 m$\mu$, $\epsilon$=17650.

The obtained product is acetylated as described in Example 18(b) to form 16-fluoromethyl-4,15-pregnadiene-17α-ol-3,20-dione-17-acetate.

(b) 2 g. of 16-fluoromethyl-4,15-pregnadiene-17α-ol-3,20-dione-17-acetate are dissolved in 60 ml. of tetrahydrofuran and refluxed for 13 hours with 1.6 g. of chloranil. The reaction mixture is diluted with water and extracted with chloroform. The combined chloroform extracts are washed subsequently with sodium hydroxide (2 N) and with water. Upon evaporation, the 16-fluoromethyl-4,6,15-pregnatriene-17α - ol - 3,20-dione-17-acetate is obtained.

Example 5

44 g. of 16-chloromethyl-16α,17α-oxido-progesterone are dissolved in 1.76 l. of dioxane. Upon addition of 880 ml. of hydrochloric acid (37%), the mixture is allowed to stand for half an hour at room temperature. Then it is poured with stirring into 18 l. of water. The precipitate is filtered off, washed with water, dried and dissolved in 100 ml. of a mixture of benzene and chloroform (1:1). The solution is chromatographed through 1.41 kg. of silica gel. The fractions proved to be uniform by thin layer chromatography are combined and the solvents are evaporated. The residue of 16-chloromethyl-4,15-pregnadiene-17α-ol-3,20-dione is recrystallized from ether. M.P. 198–199° C.; $[\alpha]_D^{24}$ —15° (chloroform);

$$\lambda_{max}. \ 239–240 \ m\mu, E^{1\%}_{1cm}. \ 480$$

Example 6

3 g. of 6α-methyl-16α,17α-oxido-16-fluoromethyl-4-pregnene-3,20-dione are dissolved in 45 ml. of dioxane. Upon addition of 7.5 ml. of perchloric acid (70%) and 7.5 ml. of water, the solution is allowed to stand for 2 hours at room temperature and then is worked up as described in Example 5 whereby the 6α-methyl-16-fluoromethyl-4,15-pregnadiene-17α-ol-3,20-dione is obtained.

Example 7

(a) According to the method of Example 1, the 16-chloromethyl-4,15-pregnadiene-17α-ol-3,20-dione is obtained from 16-chloromethyl-16α,17α-oxido-4-pregnene-3,20-dione. M.P. 198–199° C.; $[\alpha]_D^{24}$ —15° (chloroform);

$$\lambda_{max}. \ 239–240 \ m\mu, E^{1\%}_{1cm}. \ 480$$

(b) To a suspension of 6.5 g. of 16-chloromethyl-4,15-pregnadiene-17α-ol-3,20-dione in 98 ml. of tetrahydrofuran and 59 ml. of methanol, 9.8 g. of iodine and 98 g. of CaO are added in small portions within 3 hours. The reaction mixture is poured into 2 l. of ice water containing 32 ml. of glacial acetic acid. The precipitate is filtered off, dried and dissolved in 550 ml. of acetone. The solution is refluxed for 20 hours with 33 g. of potassium acetate. The acetone is partially evaporated under reduced pressure. Upon addition of water, the precipitate is filtered off and refluxed for 2 hours with a mixture of 130 ml. of methanol, 3.25 g. of sodium pyrosulfite and 48.5 ml. of water. The reaction mixture is cooled and diluted with water. The precipitated 16-chloromethyl-4,15 - pregnadiene - 17α,21 - diol-3,20-dione-21-acetate is filtered off, dried and recrystallized from methanol.

$$\lambda_{max}. \ 240 \ m\mu, E^{1\%}_{1cm}. \ 443$$

(c) 12 g. of 16-chloromethyl-4,15-pregnadiene-17α,21-diol-3,20-dione-21-acetate are dissolved in 960 ml. of methanol. Upon addition of 480 ml. of an aqueous potassium bicarbonate solution (5%), the mixture is refluxed for 3 hours. After cooling, crystals of 16-chloromethyl-4,15-pregnadiene-17α,21-diol-3,20-dione are obtained which are recrystallized from acetone $$\lambda_{max}. \ 239–240 \ m\mu, E^{1\%}_{1cm}. \ 460 \ (ethanol)$$

(d) In a fermentation vessel 15 l. of a nutrient solution containing 5% glucose, 0.1% yeast extract, 0.05% soybean meal, 0.3% NaNO$_3$, 0.05% MgSO$_4$·7H$_2$O, 0.1% KH$_2$PO$_4$, 0.05% KCl, 0.001% FeSO$_4$·7H$_2$O are inoculated with 750 ml. of a culture of Fusarium sp. The culture grows with vigorous stirring and aeration at 28° C. After 24 hours, 5 g. of 16-chloromethyl-4,15-pregnadiene-17α,21-diol-3,20-dione in 40 ml. dimethylformamide are added. As soon as the paper chromatogram no longer shows any starting material, the culture is extracted three times with 10 l. of chloroform. The chloroform extracts are evaporated; the residue is washed with petroleum ether and the 15-dehydro-16-chloromethyl-11-epi-hydrocortisone recrystallized from acetone.

$$\lambda_{max}. \ 241 \ m\mu, E^{1\%}_{1cm}. \ 430$$

(e) 2 g. of 15-dehydro-16-chloromethyl-11-epi-hydrocortisone are dissolved in 10 ml. of pyridine and 0.36 g. of glacial acetic acid anhydride. After standing for 15 hours at room temperature, the solution is poured into water and extracted three times with chloroform. The chloroform extracts are neutralized with a solution of NaHCO$_3$, dried an evaporated in vacuo. The amorphous residue of 15-dehydro-16-chloromethyl-11 - epi-hydrocortisone-21-acetate is used directly for the following oxidation.

(f) 2.7 g. of 15-dehydro-16-chloromethyl-11-epi-hydrocortisone-21-acetate are dissolved in 100 ml. of acetone and cooled to a temperature of 0 to 10° C. While stirring and cooling, 1.92 ml. of a solution of chromic acid anhydride in sulfuric acid/water (1 ml. containing 0.25 g. of $CrO_3$ are added at a temperature bleow 10° A. After stirring for 30 minutes, the reaction mixture is poured into water and extracted with chloroform. The chloroform extract is washed to neutrality, dried and evaporated whereby the 15-dehydro-16-chloromethyl-cortisone-21-acetate is obtained.

$\lambda_{max.}$ 238–239 m$\mu$, $E_{1\,cm.}^{1\%}$ 365

(g) 1 g. of 15-dehydro-16-chloromethyl-cortisone-21-acetate is refluxed with 25 ml. of methanol. To the boiling solution, a hot solution of 0.23 g. of sodium bicarbonate in 5 ml. of water is added. After boiling for 7 minutes, the solution is poured into 300 ml. of water and the precipitated crude product is filtered under suction. Upon recrystallization from acetone the pure 15-dehydro-16-chloromethyl-cortisone is obtained.

$\lambda_{max.}$ 238 m$\mu$, $E_{1\,cm.}^{1\%}$ 375

(h) In a fermentation vessel, 15 l. of a nutrient solution containing of 0.1% yeast extract, pH 6.8, are inoculated with 1.5 l. of a culture of Corynebacterium simplex. The culture is grown with constant stirring and aeration at 28° C. After 4–8 hours, 7.5 g. of 15-dehydro-16-chloromethyl-cortisone in 300 ml. of methanol are added. The dehydrogenation is controlled by paper chromatography and is usually finished after 10–14 hours. The solution is extracted three times with chloroform; the extracts are evaporated and the 15-dehydro-16-chloromethylprednisone is recrystallized from acetone.

$\lambda_{max.}$ 239 m$\mu$, $E_{1\,cm.}^{1\%}$ 400

Example 8

(a) 16-chloromethyl-4,15-pregnadiene-17$\alpha$,21-diol-3,20-dione-21-acetate are prepared according to Example 1 from 16$\beta$-chloromethyl-16$\alpha$,17$\alpha$-oxido-4-pregnene-21-ol-3,20-dione-21-acetate.

(b) According to the method described in Example 7(c), the 16-chloromethyl-4,15-pregnadiene-17$\alpha$,21-diol-3 20-dione-21-acetate is saponified to form 16-chloromethyl-4,15-pregnadiene-17$\alpha$,21-diol-3,20-dione.

(c) In a fermentation vessel, 15 l. of a nutrient solution containing 5% malt extract, 1% saccharose, 0.2% $NaNO_3$, 0.1% $K_2HPO_4$, 0.05% $MgSO_4$, 0.05% KCl and 0.005% $FeSO_4$, pH 7.0, are inoculated with 800 ml. of a culture of Curvularia lunata (Warker) Boadijn. After growth for 24 hours at 28° C., 5 g. of 16-chloromethyl-4,15-pregnadiene-17$\alpha$,21-diol-3,20-dione in 40 ml. dimethylformamide are added. As soon as the paper chromatogram no longer shows any starting material, the culture is extracted three times with chloroform. The chloroform extracts are evaporated and the residue is chromatographed through silica gel. The eluate running off with chloroform/ethyl acetate (1:3) contains 15-dehydro-16-chloromethyl-hydrocortisone.

$\lambda_{max.}$ 241–242 m$\mu$, $E_{1\,cm.}^{1\%}$ 420

(d) 5 g. of 15-dehydro-16-chloromethyl-hydrocortisone are heated with 30 ml. of pyridine and 30 ml. of acetic acid anhydride for 1 hour on the steam bath. The solution is poured into water and the precipitated 15-dehydro-16-chloromethyl-hydrocortisone-21-acetate is filtered off and recrystallized from acetone.

$\lambda_{max.}$ 241 m$\mu$, $E_{1\,cm.}^{1\%}$ 395

($e_1$) 3.5 g. of 15-dehydro-16-chloromethyl-hydrocortisone-21-acetate and 3.5 g. of 2,3-dichloro-5,6-dicyanobenzoquinone are dissolved in 70 ml. of dioxane and refluxed for 6 hours. The mixture is diluted with chloroform and washed subsequently with 30 ml. of aqueous sodium hydroxide (1 N) and water. The solution is dried and evaporated. The 15-dehydro-16-chloromethyl-prednisolone-21-acetate is recrystallized from acetone/ether.

$\lambda_{max.}$ 242 m$\mu$, $E_{1\,cm.}^{1\%}$ 350

($e_2$) In a fermentation vessel 15 l. of a nutrient solution containing 1% yeast extract, pH 6.8, are inoculated with 0.5 l. of a culture of Bacillus sphaericus. The culture is grown at 28° C. and after 10 hours 7.5 g. of 15-dehydro-16 - chloromeythl-hydrocortisone in 300 ml. of methanol are added. After 28–36 hours dehydrogenation is complete. The reaction mixture is treated according to Example 7(h). The 15-dehydro-16 - chloromethyl-prednisolone is recrystallized from acetone.

$\lambda_{max.}$ 243–244 m$\mu$, $E_{1\,cm.}^{1\%}$ 400

Example 9

(a) According to the method described in Examples 7(a) and (b), the 16-fluoromethyl-4,15-pregnadiene-17$\alpha$, 21-diol-3,20-dione-21-acetate is prepared from 16-fluoromethyl-16$\alpha$,17$\alpha$-oxido-4-pregnene-3,20-dione.

$\lambda_{max.}$ 239, 5 m$\mu$, $E_{1\,cm.}^{1\%}$ 395

(b) 12 g. of 16-fluoromethyl-4,15-pregnadiene-17$\alpha$21-diol-3,20-dione-21-acetate and 480 ml. of potassium bicarbonate (aqueous solution, 5%) are dissolved in 960 ml. of methanol and refluxed for 3 hours. Upon cooling, the 16-fluoromethyl-4,15-pregnadiene-17$\alpha$,21-diol - 3,20-dione precipitates. It is recrystallized from acetone.

$\lambda_{max.}$ 240 m$\mu$, $E_{1\,cm.}^{1\%}$ 435

(c) According to the method described in Example 8(c), the 16-fluoromethyl-15-dehydro-hydrocortisone is obtained from 16-fluoromethyl-4,15-pregnadiene-17$\alpha$,21-diol - 3,20-dione. M.P. 210–211° C.; $[\alpha]_D^{24}$ +69.7° (dioxane);

$\lambda_{max.}$ 240 m$\mu$, $E_{1\,cm.}^{1\%}$ 440

(d) 5 g. of 16-fluoromethyl-15-dehydro-hydrocortisone are heated with 30 ml. of pyridine and 120 ml. of acetic anhydride for 1 hour on the steam bath. The solution is poured into water, and the precipitated 16-fluoromethyl-15-dehydro-hydrocortisone-21-acetate is filtered off and recrystallized from acetone.

$\lambda_{max.}$ 241 m$\mu$, $E_{1\,cm.}^{1\%}$ 418

($e_1$) According to the method described in Example 8($e_2$), the 15-dehydro-16-fluoromethyl-prednisolone is prepared from 15-dehydro-16-fluoromethyl-hydrocortisone. M.P. 224–225° C., $[\alpha]_D$ +22.8° (dioxane);

$\lambda_{max.}$ 241 m$\mu$, $E_{1\,cm.}^{1\%}$ 404

It is converted by usual methods into the corresponding 21-tert.-butylacetate.

$\lambda_{max.}$ 242 m$\mu$, $E_{1\,cm.}^{1\%}$ 332

($e_2$) According to the method described in Example 8($e_1$), the 16-fluoromethyl-15-dehydro-prednisolone-21-acetate is prepared from 16-fluoromethyl-15-dehydro-hydrocortisone-21-acetate. M.P. 208–209° C.;

$[\alpha]_D$ +47.3°

$\lambda_{max.}$ 242 m$\mu$, $E_{1\,cm.}^{1\%}$ 382

(f) 2.4 g. of 16-fluoromethyl-15-dehydro-prednisolone-21-acetate are dissolved in 24 ml. of pyridine and added to a solution of 2.4 g. of chromic acid anhydride in 24 ml. of pyridine. The mixture is allowed to stand overnight and worked up in the usual way whereby the 16-fluoromethyl-15-dehydro-prednisone-21-acetate is obtained.

$\lambda_{max.}$ 239 m$\mu$, $E_{1\,cm.}^{1\%}$ 390

Upon saponification, the 16-fluoromethyl-prednisone is obtained.

Example 10

(a) According to the method described in Example 1(a), the 6$\alpha$-methyl-16-fluoromethyl-15-dehydro-17$\alpha$-hydroxy-progesterone is obtained from 6α-methyl-16-fluoromethyl-16α,17α-oxido-progesterone.

$\lambda_{max.}$ 241 m$\mu$, $E_{1\,cm.}^{1\%}$ 376

(b) According to the methods described in Example 7(b) and (c), the 6α-methyl-16-fluoromethyl-4,15-pregnadiene-17α,21-diol-3,20-dione is obtained from 6α-methyl - 16 - fluoromethyl - 15 - dehydro - 17α - hydroxyprogesterone.

$\lambda_{max.}$ 240 m$\mu$, $E_{1\,cm.}^{1\%}$ 420

(c) According to the method described in Example 8(c), the 6α-methyl-16-fluoromethyl-15-dehydro-hydrocortisone is prepared from 6α-methyl-16-fluoromethyl-4,15-pregnadiene-17α,21-diol-3,20-dione.

$\lambda_{max.}$ 240 m$\mu$, $E_{1\,cm.}^{1\%}$ 410

(d) According to the method described in Example 7(h), the 6α-methyl-16-fluoromethyl-15-dehydro-prednisolone is prepared from 6α-methyl-16-fluoromethyl-15-dehydro-hydrocortisone.

$\lambda_{max.}$ 242 m$\mu$, $E_{1\,cm.}^{1\%}$ 428

(e) According to the method described in Example 4(b), the 6α-methyl-16-fluoromethyl-15-dehydro-hydrocortisone-21-acetate (acetylated as described in Example 9(d)) is dehydrogenated to form 6α-methyl-16-fluoromethyl - 4,6,15 - pregnatriene-11β,17α,21-triol-3,20-dione-21-acetate.

(f) The product of Example 10(e) is dehydrogenated according to the method described in Example 8(e₁) whereby the 6α-methyl-16-fluoromethyl-1,4,6,15-pregnatetraene-11β,17α,21-triol-3,20-dione-21-acetate is obtained.

The corresponding 21-alcohol is prepared by saponification of this product as described in Example 9(b).

*Example 11*

According to the methods set forth in Example 10, the 6α-methyl-16-chloromethyl-15-dehydro-prednisolone and the 6α-methyl-16-chloromethyl-1,4,6,15-pregnatetraene-11β,17α,21-triol-3,20-dione are obtained from 6α-methyl-16β-chloromethyl-16α,17α-oxido-progesterone.

*Example 12*

According to the methods set forth in Example 10, the 6α-fluoro-16-fluoromethyl-15-dehydro-prednisolone is obtained from 6α-fluoro-16β-fluoromethyl-16α,17α-oxido-progesterone.

$\lambda_{max.}$ 242 m$\mu$, $E_{1\,cm.}^{1\%}$ 410

*Example 13*

According to the methods set forth in Example 10, the 6α-fluoro-16-chloromethyl-15-dhydro-prednisolone is obtained from 6α-fluoro-16β-chloromethyl-16α,17α-oxido-progesterone.

$\lambda_{max.}$ 241 m$\mu$, $E_{1\,cm.}^{1\%}$ 418

*Example 14*

(a) 16 - chloromethyl-15-dehydro-17α-hydroxy-progesterone is prepared in accordance with the method of Example 5. M.P. 198–199° C.

(b) The product obtained in Example 14(a) is subjected to the action of *Curvularia lunata* according to the procedure set forth in Example 8(c) to form 16-chloromethyl-4,15-pregnadiene-11β,17α-diol-3,20-dione.

$\lambda_{max.}$ 241 m$\mu$, $E_{1\,cm.}^{1\%}$ 410

(c) 16 - chloromethyl - 4,15-pregnadiene-11β,17α-diol-3,20-dione was treated in accordance with the method described in Example 7(b) to form 16-chloromethyl-4,15-pregnadiene-11β,17α,21-triol-3,20-dione-21-acetate.

(d) The solution of 2 g. of 16-chloromethyl-4,15-pregnadiene-11β,17α,21-triol-3,20-dione-21-acetate in 60 ml. of tetrahydrofuran is refluxed for 12 hours with 1.58 g. of chloranil. The reaction mixture is diluted with water and extracted with chloroform. The combined chloroform extracts are washed with sodium hydroxide (2 N) and with water. Upon evaporation, the 16-chloromethyl-4,6,15 - pregnatriene - 11β,17α,21-triol-3,20-dione-21-acetate crystallizes with methanol.

(e) As described in Example 7(g), the 16-chloromethyl - 4,6,15 - pregnatriene - 11β,17α,21-triol-3,20-dione-21-acetate is saponified to form 16-chloromethyl-4,6,15-pregnatriene-11β,17α,21-triol-3,20-dione.

$\lambda_{max.}$ 282.5 m$\mu$, $E_{1\,cm.}^{1\%}$ 690

(f) According to the procedure set forth in Example 8(e₁), the 16 - chloromethyl - 4,6,15 - pregnatriene-11β,17α,21-triol-3,20-dione-21-acetate is dehydrogenated to form 16 - chloromethyl - 1,4,6,15 - pregnatetraene-11β,17α,21-triol-3,20-dione-21-acetate.

(g) As described in Example 7(g), the 16-chloromethyl - 1,4,6,15 - pregnatetraene-11β,17α,21-triol-3,20-dione-21-acetate is saponified to prepare the 16-chloromethyl-1,4,6,15-pregnatetraene-11β,17α,21-triol-3,20-dione.

$\lambda_{max.}$ 284 m$\mu$, $E_{1\,cm.}^{1\%}$ 350

*Example 15*

The procedure of Example 14 is applied identically to 16β-fluoromethyl-16α,17α-oxidoprogesterone to prepare 16 - fluoromethyl - 4,6,15-pregnatriene-11β,17α,21-triol-3,20-dione and 16-fluoromethyl-1,4,6,15-pregnatetraene-11β,17α,21-triol-3,20-dione.

*Example 16*

(a) According to the methods given in Example 7(a) to 7(e), the 16 - fluoromethyl-11-epi-15-dehydro-hydrocortisone-21-acetate is prepared from 16β-fluoromethyl-16α,17α-oxido-progesterone.

$\lambda_{max.}$ 241 m$\mu$, $E_{1\,cm.}^{1\%}$ 380

(b) The 16 - fluoromethyl-11-epi-15-dehydro-hydrocortisone-21-acetate is dissolved in 25 ml. of chloroform and 25 ml. of pyridine. The solution is cooled to 0° C. and 7 g. of p-toluene-sulfonic acid are added with stirring. The mixture is stirred for another 2 hours at 0° C. and is allowed to stand overnight at room temperature. Then it is poured into water and extracted several times with chloroform. The chloroform extracts are neutralized and dried. Upon evaporation, the 16-fluoromethyl-11-epi-15-dehydrohydrocortisone-11-tosylate-21-acetate is recrystallized from methanol.

The ester thus obtained is dissolved in 75 ml. of glacial acetic acid and refluxed for 30 minutes with 9 g. of anhydrous sodium acetate. The mixture is poured into 500 ml. of water. The precipitated 16-fluoromethyl-4,9(11),15 - pregnatriene-17α,21-diol-3,20-dione-21-acetate is filtered off and recrystallized from ethyl acetate.

$\lambda_{max.}$ 239 m$\mu$, $E_{1\,cm.}^{1\%}$ 425

(c) 7.8 g. of 16-fluoromethyl-4,9(11),15-pregnatriene-17α,21-diol-3,20-dione-21-acetate are dissolved in 315 ml. of dioxane and 40 ml. of water. After addition of 4.55 g. of N-bromo-succinimide and 1.68 ml. of perchloric acid (70%), the mixture is allowed to stand for 1 hour at room temperature. Then it is poured into water. The precipitated 16-fluoromethyl-9α-bromo-15-dehydrohydrocortisone-21-acetate is filtered off, washed with water and dried.

(d) The crude 16-fluoromethyl-9α-bromo-15-dehydrohydrocortisone-21-acetate is dissolved in 450 ml. of ethanol and refluxed for 2 hours with 19 g. of potassium acetate. The mixture is poured into water and the obtained emulsion is extracted several times with chloroform. The combined chloroform extracts are worked up in the usual way. Upon evaporation, the 16-fluoromethyl-9β,11β-oxido-4,15-pregnadiene-17α,21-diol-3,20-dione-21-acetate is recrystallized from methanol.

$\lambda_{max.}$ 244 m$\mu$, $E_{1\,cm.}^{1\%}$ 379

(e) 4.2 g. of 16-fluoromethyl-9β,11β-oxido-4,15-pregnadiene-17α,21-diol-3,20-dione-21-acetate are dissolved in 42 ml. of anhydrous chloroform and added at −60° to 25 ml. of a mixture of 40 ml. of tetrahydrofuran, 15 ml. of chloroform and 25 g. of hydrogen fluoride. The reaction mixture is allowed to stand for 4 hours at −30° and for 4 hours at 0°. The solution is poured into a solution of NaHCO₃. The steroid is extracted with chloroform. Upon evaporation, the 9α-fluoro-16-fluoromethyl-15-dehydro-hydrocortisone-21-acetate is recrystallized from acetone.

$\lambda_{max.}$ 239 m$\mu$, $E_{1 cm.}^{1\%}$ 375

(f) 9α - fluoro-16-fluoromethyl-15-dehydro-hydrocortisone-acetate is saponified according to Example 7(g) to prepare 9α - fluoro-16-fluoromethyl-15-dehydro-hydrocortisone.

(g) According to the method described in Example 8(e₂), the 9α - fluoro-16-fluoromethyl-15-dehydro-hydrocortisone is dehydrogenated by the action of *Bacillus sphaericus* to form 9α-fluoro-16-fluoromethyl-15-dehydro-prednisolone.

$\lambda_{max.}$ 239 m$\mu$, $E_{1 cm.}^{1\%}$ 410

*Example 17*

According to the method described in Example 16, the 9α-fluoro-16-chloromethyl-15-dehydro-prednisolone is prepared from 16β-chloromethyl-16α,17α-oxido-progesterone.

$\lambda_{max.}$ 239 m$\mu$, $E_{1 cm.}^{1\%}$ 400

*Example 18*

(a) According to the method described in Example 1, the 6α - methyl-16-fluoromethyl-17α-hydroxy-15-dehydro-progesterone is obtained from 6α-methyl-16-fluoromethyl-16α,17α-oxido-progesterone.

(b) 10.5 g. of 6α-methyl-16-fluoromethyl-4,15-pregnadiene-3,20-dione-17α-ol are allowed to stand overnight at room temperature with 796 ml. of glacial acetic acid, 160 ml. of acetic anhydride and 16 g. of p-toluene solfonic acid. The reaction mixture is poured into water; the precipitate is filtered off, washed with water and dried. The crude product is dissolved in benzene and filtered through alumina. The combined benzene eluates are concentrated. The 6α-methyl - 16 - fluoromethyl-4,15-pregnadiene-3,20-dione-17α-ol-17-acetate is crystallized from ether.

$\lambda_{max.}$ 240 m$\mu$, $E_{1 cm.}^{1\%}$ 415

(c) 5 g. of 6α-methyl-16-fluoromethyl-4,15-pregnadiene-3,20-dione-17α-ol-acetate are refluxed for 7 hours with 100 ml. of methylethylketone and 7 g. of chloranil. Upon cooling, the solution is poured into water and extracted with chloroform. The chloroform extract is washed subsequently with water, aqueous sodium hydroxide (1%) and again water and is dried with sodium sulfate. Upon evaporation, the 6 - methyl - 16 - fluoromethyl - 4,6,15 - pregnatriene-17α-ol-3,20-dione-17-acetate is crystallized from methanol.

$\lambda_{max.}$ 290 m$\mu$, $E_{1 cm.}^{1\%}$ 603

*Example 19*

(a) 8.5 g. of 16-fluoromethyl-4,15-pregnadiene-11β, 17α,21-triol-3,20-dione-21-acetate obtained according to Example 9(d) are refluxed for 7 hours with 335 ml. of tert.butanol and 59 g. of chloranil. The solution is concentrated to a volume of 100 ml. and extracted exhaustedly with chloroform upon addition of 380 ml. of water. The combined chloroform extracts are treated with ice cooled aqueous sodium hydroxide, washed with water to neutrality and concentrated under reduced pressure. The residue is dissolved in 25 ml. of a mixture containing equal volumes of benzene and of chloroform and chromatographed through 370 g. of florisil. The column is eluated with benzene/chloroform (1:1). The eluates 20 to 50, each of 200 ml., are combined and concentrated. The 16-fluoromethyl-4,6,15-pregnatriene-11β,17α,21-triol-3,20-dione-21-acetate is recrystallized from ethyl acetate.

$\lambda_{max.}$ 285 m$\mu$, $E_{1 cm.}^{1\%}$ 590

(b) 5.8 g. of 16-fluoromethyl-4,6,15-pregnatriene-11β, 17α,21-triol-3,20-dione-21-acetate are dissolved in 160 ml. of methanol and refluxed for 14 minutes upon addition of a hot solution of 1.28 g. of sodium bicarbonate in 19 ml. of water. The cooled solution is poured into a mixture of 900 ml. of water and 3 ml. of acetic acid, and extracted with chloroform. The combined extracts are washed with water and concentrated. The 16-fluoromethyl-4,6, 15-pregnatriene-11β,17α,21-triol-3,20-dione is recrystallized from methanol.

$\lambda_{max.}$ 285 m$\mu$, $E_{1 cm.}^{1\%}$ 615

(c₁) According to the method described in Example 7(h), 5 g. of 16-fluoromethyl-4,6,15-pregnatriene-11β, 17α,21-triol-3,20-dione are dehydrogenated whereby the 16 - fluoromethyl-1,4,6,15-pregnatetraene-11β,17α,21-triol-3,20-dione is obtained.

$\lambda_{max.}$ 220, 255, 298 m$\mu$, $E_{1 cm.}^{1\%}$ 330, 243, 324

(c₂) According to the method described in Example 2(e₂), 5 g. of 16-fluoromethyl-4,6,15-pregnatriene-11β, 17α,21-triol-3,20-dione are dehydrogenated within 22 hours. The obtained 16-fluoromethyl-1,4,6,15-pregnatetraene-11β,17α,21-triol-3,20-dione is recrystallized from ethyl acetate.

$\lambda_{max.}$ 220, 255, 298 m$\mu$, $E_{1 cm.}^{1\%}$ 330, 243, 324

*Example 20*

(a) 1.5 g. of 6-chloro-16β-fluoromethyl-16α,17α-oxido-4,6-pregnadiene-3,20-dione are dissolved in 23 ml. of acetone. The solution is allowed to stand for 2 hours at room temperature with 7.5 ml. of sulfuric acid (35%). The reaction mixture is worked up as described in Example 1 whereby the 6-chloro-16-fluoromethyl-4,6,15-pregnatriene-3,20-dione-17α-ol is obtained.

$\lambda_{max.}$ 284 m$\mu$, $E_{1 cm.}^{1\%}$ 560

(b) According to the method described in Example 18(b), the 6-chloro-16-fluoromethyl-4,6,15-pregnatriene-17α-ol-3,20-dione is acetylated to form 6-chloro-16-fluoromethyl-4,6,15-pregnatriene-17α-ol-3,20-dione-17-acetate.

$\lambda_{max.}$ 285 m$\mu$, $E_{1 cm.}^{1\%}$ 550

The corresponding 16-chloromethyl-compound is obtained when using 6-chloro-16β-chloromethyl-16α,17α-oxido-4,6-pregnadiene-3,20-dione as starting material.

*Example 21*

A variety of esters of the compounds prepared in accordance with the procedures of the preceding examples are prepared by treating the free alcohols with acylating agents by conventional methods. Thus, the hydroxyl group in the 21-position of the following compounds is esterified:

15-dehydro-16-fluoromethyl-prednisolone
15-dehydro-16-chloromethyl-prednisolone
15-dehydro-16-fluoromethyl-prednisone
6α-methyl-15-dehydro-16-fluoromethyl-prednisolone
6α-methyl-15-dehydro-16-chloromethyl-prednisolone
6α-fluoro-15-dehydro-16-fluoromethyl-prednisolone
9α-fluoro-15-dehydro-16-fluoromethyl-prednisolone
6,15-bis-dehydro-16-fluoromethyl-prednisolone
6,15-bis-dehydro-16-fluoromethyl-hydrocortisone.

The esthers include the phosphate and the sodium salts thereof; the hemisulfate and the sodium salt thereof; the hemisuccinate and the sodium salt thereof; the diethylaminoacetate and the hydrochloride thereof; the acetate; the tert.butylacetate; the trimethylacetate; and the meta-sulfobenzoate.

Likewise, the 17α-acetates and 17α-capronates of 15-dehydro-16-fluoromethyl-17α-hydroxy - progesterone, 6α- methyl-15-dehydro-16-fluoromethyl-17α-hydroxy-progesterone, 6,15-bis-dehydro-16-fluoromethyl-17α-hydroxy progesterone, and 6-chloro-6,15-bis-dehydro-16-fluoromethyl-17α-hydroxy-progesterone are prepared by treatment with the corresponding acylating agents in the usual manner.

What we claim is:
1. A compound selected from the group consisting of

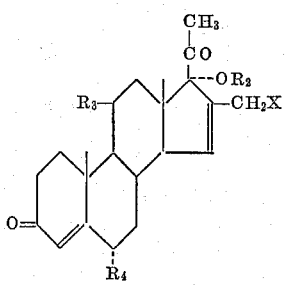

and the Δ⁶-derivatives thereof, wherein
$R_2$ is a member of the group consisting of hydrogen and the acid moiety of an aliphatic carboxylic acid containing up to 8 carbon atoms;
$R_3$ is a member of the group consisting of OH and H;
$R_4$ is a member of the group consisting of hydrogen, methyl and chlorine, with the provision that when $R_3$ represents OH, $R_4$ is hydrogen; and
X is a member of the group consisting of chlorine and fluorine.

2. A pharmaceutical composition containing from 0.1 to 70 mg. of a compound as claimed in claim 1 together with a pharmaceutically acceptable carrier.

3. 15-dehydro-16-fluoromethyl-17α-acetoxy-progesterone.

4. 6α-methyl-16-fluoromethyl-4,15-pregnadiene-17α-ol-3,20-dione-17-acetate.

5. 16-fluoromethyl-4,6,15-pregnatriene-17α-ol-3,20-dione-17-acetate.

6. 6-chloro-16-fluoromethyl-4,6,15-pregnatriene-17α-ol-3,20-dione-17-acetate.

References Cited by the Examiner
UNITED STATES PATENTS

| | | | |
|---|---|---|---|
| 2,883,379 | 4/59 | Moreland | 260—239.55 |
| 3,057,884 | 10/62 | Walker et al. | 260—397.3 |
| 3,065,239 | 11/62 | Wendler et al. | 260—397.45 |

LEWIS GOTTS, *Primary Examiner.*

UNITED STATES PATENT OFFICE
CERTIFICATE OF CORRECTION

Patent No. 3,183,150              May 11, 1965

Fritz von Werder et al.

It is hereby certified that error appears in the above numbered patent requiring correction and that the said Letters Patent should read as corrected below.

Column 1, line 20, for "includes" read -- include --; line 43, for "aydrogen" read -- hydrogen --; same column 1, lines 50 to 62, the formula should appear as shown below instead of as in the patent:

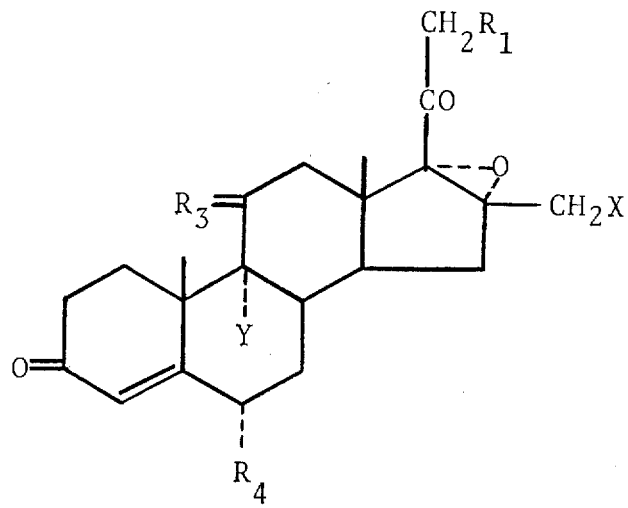

column 3, line 3, for "optiumum" read -- optimum --; line 9, for "from" read -- form --; line 31, after "dioxane" strike out the comma; same column 3, line 46, for "fermentatioin" read -- fermentation --; column 6, line 63, for "epic-" read -- epi- --; line 72, for "an" read -- and --; column 7, line 6, after "$CrO_3$" insert a closing parenthesis; same line 6, for "bleow 10° A." read -- below 10° C. --; same column 7, line 40, for "-oxide-" read -- -oxido- --; column 9, line 51, for "-dhydro-" read -- -dehydro- --; column 10, lines 44 and 60, for "16-fiuoromethyl-", each occurrence, read -- 16-fluoromethyl- --.

Signed and sealed this 12th day of October 1965.

(SEAL)
Attest:

ERNEST W. SWIDER            EDWARD J. BRENNER
Attesting Officer            Commissioner of Patents